E. CARIUS.
TOY BRICK PRESS.
APPLICATION FILED NOV. 30, 1914.
1,156,521.
Patented Oct. 12, 1915.
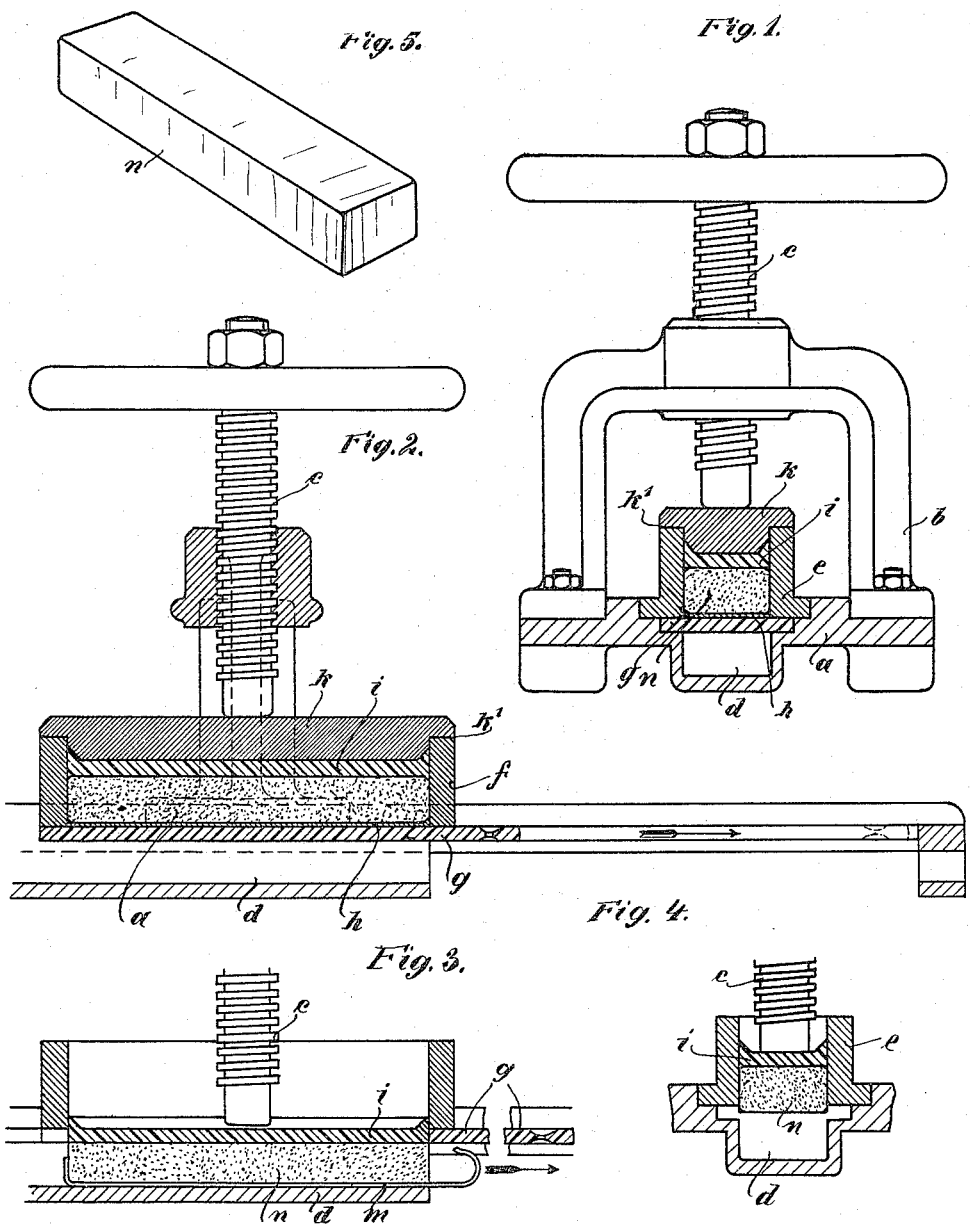

UNITED STATES PATENT OFFICE.

EMIL CARIUS, OF TAUCHA, NEAR LEIPZIG, GERMANY.

TOY BRICK-PRESS.

1,156,521.  Specification of Letters Patent.  Patented Oct. 12, 1915.

Application filed November 30, 1914. Serial No. 874,875.

*To all whom it may concern:*

Be it known that I, EMIL CARIUS, a citizen of the German Empire, residing at Taucha, near Leipzig, in Germany, have invented certain new and useful Improvements in Toy Brick-Presses, of which the following is a specification.

The object of this invention is to provide a molding press, particularly adapted for the use of children, enabling toy building blocks, tiles, mosaic stones and the like to be produced for use in building games, the raw material being a plastic mass, such as cement.

An embodiment of the invention is shown in the accompanying drawing, in which—

Figure 1 is a vertical section of the press, and Fig. 2 a vertical section at right angles to the plane of Fig. 1. Figs. 3 and 4 are sections of part of the press, showing the manner in which the work is removed from the mold. Fig. 5 is a perspective view, to a larger scale, of a block produced in the press.

The apparatus illustrated comprises a bed plate $a$ and a yoke $b$, in which works a screw spindle $c$ having a hand wheel at the top. The plate has a depression forming an open ended channel $d$, and over this channel there is a mold having side walls $e$, end walls $f$, and a loose floor plate $g$. The latter and the walls are slidable in grooves cut into the plate $a$, so that the mold can be drawn out from under the screw spindle. A pattern plate $h$ is laid upon the floor plate $g$, to produce an ornamental surface on the work. A cover plate $i$ vertically movable between the walls $e$ and $f$ completes the mold, and can be forced down, to compress a body of plastic mass $n$, by means of a press plate $k$ acted on by the screw $c$. The plate $k$ has flanges $k^1$ adapted to rest on the walls $e$, $f$ and limit its downward movement.

When the plastic mass has been compressed to produce a block in the mold, the pressure is relaxed, by raising the screw, and the bottom plate $g$ is withdrawn. Then the screw is screwed down again, to expel the block from the mold into the channel $d$, as shown in Fig. 4. A slide $m$ having a hook may be placed in the channel $d$ to receive the block, as shown in Fig. 3.

I may insert partitions in the mold, for producing a plurality of smaller blocks or tiles by a single operation, and may make the walls $e$ and $f$ adjustable in relation to each other, or exchangeable, for the purpose of producing blocks of different sizes. A thin layer of color may be placed in the mold, before introducing the plastic mass, in order to color the block produced. Instead of a screw I may use other means for applying pressure, for example a toggle joint.

What I claim as my invention and desire to secure by Letters Patent of the United States is:—

In a molding press the combination of a bed plate having a depression, whereby an open ended channel is formed, and a mold on said bed plate, said mold consisting of side and end walls, a cover plate vertically movable between said side and end walls, a removable press plate adapted to be inserted beneath the cover plate during the pressing operation and having flanges adapted to bear on the mold for limiting the downward movement of the press plate, and a loose floor plate covering said channel and adapted to be separately withdrawn.

In witness whereof I have signed this specification in the presence of two witnesses.

EMIL CARIUS.

Witnesses:
 ARTHUR WERNER,
 HEINRICH SCHMIDT.